(12) United States Patent
Brandt et al.

(10) Patent No.: US 12,013,623 B2
(45) Date of Patent: Jun. 18, 2024

(54) DISPLAY DEVICE WITH ADJUSTABLE VIEWING ANGLE

(71) Applicant: Harman Becker Automotive Systems GmbH, Karlsbad (DE)

(72) Inventors: Peter Brandt, Pfinztal (DE); Wieland Oberst, Kraichtal (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 109 days.

(21) Appl. No.: 17/774,778

(22) PCT Filed: Nov. 6, 2019

(86) PCT No.: PCT/EP2019/080390
§ 371 (c)(1),
(2) Date: May 5, 2022

(87) PCT Pub. No.: WO2021/089138
PCT Pub. Date: May 14, 2021

(65) Prior Publication Data
US 2022/0382123 A1    Dec. 1, 2022

(51) Int. Cl.
*G02F 1/29*      (2006.01)
*B60K 35/00*   (2006.01)
*B60K 35/22*   (2024.01)

(52) U.S. Cl.
CPC .............. *G02F 1/294* (2021.01); *B60K 35/00* (2013.01); *B60K 35/22* (2024.01)

(58) Field of Classification Search
CPC ....... G02F 1/294; G02F 1/1323; B60K 35/00; B60K 2370/152
See application file for complete search history.

(56) References Cited

U.S. PATENT DOCUMENTS

| 8,262,271 B2 | 9/2012 | Tillin et al. |
| 2006/0238545 A1 | 10/2006 | Bakin et al. |
| 2010/0265435 A1 | 10/2010 | Hwang et al. |

(Continued)

FOREIGN PATENT DOCUMENTS

| JP | H05323307 A | 12/1993 |
| WO | 2017118224 A1 | 7/2017 |

OTHER PUBLICATIONS

International Search Report dated Jul. 17, 2020 for PCT Appn. No. PCT/EP2019/080390 filed Nov. 6, 2019, 13 pgs.

(Continued)

*Primary Examiner* — James A Dudek
(74) *Attorney, Agent, or Firm* — Brooks Kushman P.C.

(57) ABSTRACT

A display device with adjustable viewing angle is provided, which includes a display unit with a plurality of pixels arranged in a pixel array and emitting light for displaying image information to a user, a plurality of electro-optical lenses with adjustable optical power arranged in a lens array at the display unit, wherein each electro-optical lens is adjustable between a public mode, in which the electro-optical lens is configured to project light from the display unit towards the user within a first viewing angle, and a privacy mode, in which the electro-optical lens is configured to project the light towards the user within a second viewing angle, smaller than the first viewing angle.

19 Claims, 9 Drawing Sheets

(56) References Cited

U.S. PATENT DOCUMENTS

2017/0219859 A1* 8/2017 Christophy ............... G02F 1/29

OTHER PUBLICATIONS

International Preliminary Report on Patentability dated May 19, 2022 for PCT Appn. No. PCT/EP2019/080390 filed Nov. 6, 2019, 10 pgs.
Chinese Office Action for CN Application No. 201980101713.8 filed Nov. 6, 2019, dated Jul. 29, 2023, 10 pages.
Second Chinese Office Action for CN Application No. 201980101713.8 filed Nov. 6, 2019, dated Jan. 27, 2024, 20 pages.

* cited by examiner

DISPLAY DEVICE WITH ADJUSTABLE VIEWING ANGLE

CROSS-REFERENCE TO RELATED APPLICATION

This application is the U.S. national phase of PCT Application No. PCT/EP2019/080390 filed on Nov. 6, 2019, the disclosure of which is hereby incorporated in its entirety by reference herein.

TECHNICAL FIELD

Various examples of the present disclosure generally relate to display devices, and specifically to a display device with adjustable viewing angle. A corresponding method for adjusting a viewing angle of a display device, and a vehicle comprising at least one display device according to the present disclosure are provided.

BACKGROUND

Entertainment and internet services have an increasing influence in many technological fields, in particular the automotive industry. However, by virtue of regulation, in many countries a driver of a vehicle should not be distracted by service contents on a dashboard display device.

In the automotive display market, there is a trend for high-resolution displays with wide color gamut, showing entertainment content to a codriver, however due to wide viewing angles of displays, often the driver will be distracted by the content intended for the codriver.

Conventional techniques for providing dedicated content to a codriver only include statical light control films, such as louver films, prismatic films influencing the angular distribution of a display backlight, with predefined light distributions, i.e. viewing angles of display devices.

For providing more flexibility and viewing comfort to a user of a display device, it may be desirable to show, for example, navigation and other car relevant information in a public mode, i.e. visible to driver and passenger, and entertainment services in privacy mode, i.e. visible only to one or more passengers.

Display devices with switchable privacy mode are, for example, switchable light guide systems using dedicated light guide systems for different viewing angles, or Polymer Dispersed Liquid Crystal (PDLC) systems, which can continuously vary between transparent and diffuse light distributions, but usually depend on high operating voltages. Furthermore, electro-optical beam shaping systems have been demonstrated which include electro-optical diffractive elements, however these systems require coherent light, i.e. laser light, as input.

Therefore, the idea of the presented approach is to provide an advanced display device and a method for operating a display device, which overcome or mitigate at least some the above-identified limitations and drawbacks.

SUMMARY

This is done by the subject matter of the independent claims. Further advantageous features are subject matter of the dependent claims.

The solution according to the invention is described with respect to the claimed display devices as well as with respect to the claimed methods for operating a display device. Features, advantages, or alternative embodiments herein may be assigned to the other claimed objects, and vice versa. In other words, claims for the methods of operating a display device may be improved with features described or claimed in the context of the display devices, and the claims for the display devices may be improved with features described or claimed in the context of the methods. In this case, the functional features of the method may be embodied by respective objective units of the display device. Furthermore, advantageous features described in the context of a display device with an electro-optical lens array arranged between a display unit may and the user, may be used to improve a display device with an electro-optical lens array arranged between a backlight unit and a display device, and vice versa. In this case, the projected light of each of the at least one of the plurality of pixels corresponds to the projected light of each of the plurality of backlight light sources.

A display device with adjustable viewing angle is provided, which includes a display unit comprising a plurality of pixels arranged in a 2-dimensional pixel array and emitting light for displaying image information to a user.

A viewing angle of a display device may correspond to a spatial angle, in which a user looking at the display device can see the image information displayed on the display device. In a more general sense, a viewing angle may refer to a narrow or broad light distribution over angle of the emitted light of a display device in the far field, wherein each of the electro-optical lenses in an array projects light projects light with the same light distribution, i.e. having the same viewing angle.

For example, a viewing angle may correspond to an angle, within which the emitted light from a display pixel is projected with a minimum light intensity by an electro-optical lens. The projected light may have a light distribution, or light intensity distribution over angular directions, which may have a center, i.e. maximum intensity along the projection axis, and which may further comprise a symmetrical light distribution. Likewise, a viewing angle may be defined by comprising the light intensity distribution until half maximum values of the light intensity, in specific cases until the light intensity drops below limits defined as 25%, 10%, 5%, or 1% of the maximum light intensity. In other words, a viewing angle may include the light projection direction with the maximum light intensity along the projection axis, and may include all further projection directions, in which the projected light has an intensity higher than 25%, 10%, 5%, or 1% of the maximum light intensity.

In various examples, the light distribution may by a symmetrical light distribution, having axial symmetry around a projection axis of an electro-optical lens, or having a mirror symmetry in case of a cylindrical electro-optical lens. In such a way, when the light has a symmetrical light distribution around a projection axis, the viewing angle may be defined as an angular value limiting the outer directions, in which the light intensity reaches the above defined limits.

A display unit comprising a plurality of pixels arranged in a 2-dimensional pixel array and emitting light for displaying image information to a user, may be for example, a liquid crystal display (LCD) unit or an organic light-emitting diode unit, or any other type of display unit as known in the art, which is based on a plurality of pixels arranged in an array for displaying image information contained in an image signal provided to the display device.

The display device further comprises a plurality of electro-optical lenses. The plurality of electro-optical lenses have adjustable focal lengths, or optical power, which can vary dependent on an electrical voltage applied to the electro-optical lenses. In other words, the electro-optical lenses may have adjustable focal lengths, which can be electrically controlled by applying an electrical field. Therein, an outer shape of the electro-optical lens may remain unchanged, while the refractive index of the electro-optical lens changes. In various embodiments, a electro-optical lens may have a predefined optical power portion, which may be provided by upper and/or lower substrates enclosing the LC molecules, and a variable optical power portion provided by different alignments of the LC molecules depending on an variable electrical field.

In more general terms, an electro-optical lens can have varying optical power, i.e. focal lengths, which are not necessarily symmetrical, and, in general, can provide varying light distributions of projected light, and for example, varying light projecting axes, in dependency of varying electrical voltages applied. A selected light distribution, may be provided by applying a respective predetermined electrical voltage to the electro-optical lens.

The plurality of electro-optical lenses are arranged in a 2-dimensional lens array at the display unit, wherein each electro-optical lens is configured to collect the light from at least one of the plurality of pixels and to project the light along a respective lens projection axis of the respective electro-optical lens.

As the pixels, also the electro-optical lenses may be arranged in a planar array, i.e. having a planar surface. The plurality of electro-optical lenses may be provided in an integrally formed array, with upper and lower transparent substrates, providing a preset optical power and additionally an adjustable, varying optical power, for each of the electro-optical lenses. Such a lens arrangement may be easier to produce than discrete electro-optical lenses, and may provide a tuneable micro-lens array.

The lens array is be arranged at the pixel array, such that each lens is associated with at least one pixel and collects the light emitted from each of the at least one associated pixel. For example, the lens array and the pixel array may be arranged adjacent to each other, or directly adjacent to each other, i.e. extending parallelly along each other. The lens array and the pixel array may be arranged in a predetermined distance to each other, such that the light from each pixel illuminates the complete lens area.

By applying an electric voltage to the each of the electro-optical lenses, each electro-optical lens is adjustable between a public mode, in which the electro-optical lens has a first optical power, or first focal length, in which the electro-optical lens is configured to project the light along the respective lens projection axis within a first viewing angle, and a privacy mode, in which the electro-optical lens has a second optical power, or focal length, different from the first optical power or focal length, in which the electro-optical lens is configured to project the light along the respective lens projection axis within a second viewing angle, smaller than the first viewing angle.

A smaller viewing angle may refer to a narrower light distribution, along the optical lens projection axis, such that that image information on the display is not visible to a viewer, or user, which looks onto the display device from a direction outside the viewing angle.

By the techniques according to the invention, a display device with an adjustable viewing angle is provided, which allows to show different information content, for example, to a driver and co-driver of a vehicle, without driver distraction. A switchable privacy mode may be provided, wherein it is possible to switch between privacy and public mode as operation modes of the display device. Likewise, a viewing angle may be selectively set according to user preferences or operational states of a vehicle comprising such a display device. Thereby, the improved display devices according to the invention allow low latency, free outer contoures, wide color gamut, high resolution, low power consumption, high brightness, and high efficiency.

A display device with adjustable viewing angle is provided, which comprises a backlight unit, comprising a plurality of light sources, for illuminating the pixels of the display unit from a side opposite the user, wherein the pixels themselves often do not act as a light source. The display device further includes a display unit comprising a plurality of pixels arranged in a 2-dimensional pixel array for displaying image information to a user as described. The backlight unit is arranged at a display unit on a side facing away from the user, i.e. projection direction, for illuminating the pixels of the display unit. Therein, the light from the backlight light sources is projected onto, i.e. through, the pixels with a viewing angle. The light from the backlight unit may be uncoherent light.

Between the backlight and the display unit, a plurality of electro-optical lenses with adjustable optical power are arranged in a 2-dimensional lens array, wherein each electro-optical lens is configured to collect light from at least one of the plurality of light sources and to project the light along a respective lens projection axis onto at least one of the plurality of pixels.

The lenses, specifically each electro-optical lens, are adjustable between a public mode, in which the electro-optical lens is configured to project the light along the respective lens projection axis within a first viewing angle, and a privacy mode, in which the electro-optical lens is configured to project the light along the respective lens projection axis within a second viewing angle, smaller than the first viewing angle.

In other words, the electro-optical lens array may be arranged above or below the display unit, and in such a way either collects light from the pixels and projects the light towards a user, or collects light from the backlight unit light sources and projects the light onto, or through, pixels, wherein different viewing angles of the display device realized.

In various embodiments, the light sources in the backlight unit may be arranged in a light source array, in a plane defined by a x-direction and y-direction corresponding to x- and y-direction of the pixel array and/or the lens array.

The light sources may be arranged in the light source array having a light source x- and y-light source pitch in the respective directions. The x- and y-light source pitch may be equal to the x- and/or y-pixel and/or lens pitch in the respective directions.

In various examples, there is a one-to-one correspondence between electro-optical lenses and light sources, i.e. exactly one lens collects light and projects light from exactly one light source. In various other examples, an electro-optical lens is associated with and collects light from a plurality of light sources, and/or projects the collected light onto a plurality of pixels of the display unit.

A method for operating a display device comprises the following steps. In a step, a display unit is provided, which comprises a plurality of pixels arranged in a 2-dimensional pixel array emitting light for displaying image information to a user. In another step, a plurality of electro-optical lenses with adjustable optical power is provided, which are arranged in a 2-dimensional lens array at the display unit. Therein, each electro-optical lens is configured to collect light from at least one of the plurality of pixels and to project the light along a respective lens projection axis. In another step, and operation mode is determined for the display device. In another step, each electro-optical lens is adjusted based on the determined operation mode between a public mode, in which the electro-optical lens is configured to project the light along the respective lens projection axis within a first viewing angle, and a privacy mode, in which the electro-optical lens is configured to project the light along the respective lens projection axis within a second viewing angle, smaller than the first viewing angle.

A further method for operating a display device comprises the following steps. In a step, a backlight unit is provided comprising a plurality of light sources. In another step, a display unit is provided comprising a plurality of pixels arranged in a 2-dimensional pixel array for displaying image information to a user. In another step, a plurality of electro-optical lenses with adjustable optical power is provided, arranged in a 2-dimensional lens array between the backlight unit and the display units. Therein, each electro-optical lens is configured to collect the light of at least one of the plurality of light sources and to project the light along a respective lens projection axis of each electro optical lens onto at least one of the plurality of pixels. In another step, and operation mode for the display device is determined. In another step, each electro-optical lens is adjusted based on the determined operation mode between a public mode, in which each electro-optical lens is configured to project the light along the respective lens projection axis within a first viewing angle, and a privacy mode, in which each electro-optical lens is configured to project the light along the respective lens projection axis within a second viewing angle, smaller than the first viewing angle.

An electronic communication device or a vehicle comprises at least one display device according to the present disclosure.

For such a method, electronic device, vehicle, technical effects may be achieved, which correspond to the technical effects described for the display device.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

Therefore, the above summary is merely intended to give a short overview over some features of some embodiments and implementations and is not to be construed as limiting. Other embodiments may comprise other features than the ones explained above.

BRIEF DESCRIPTION OF THE DRAWINGS

The foregoing and additional features and advantages of the invention will become apparent from the following detailed description when read in conjunction with the accompanying drawings, in which like reference numerals refer to like elements.

DETAILED DESCRIPTION

Figure 1:
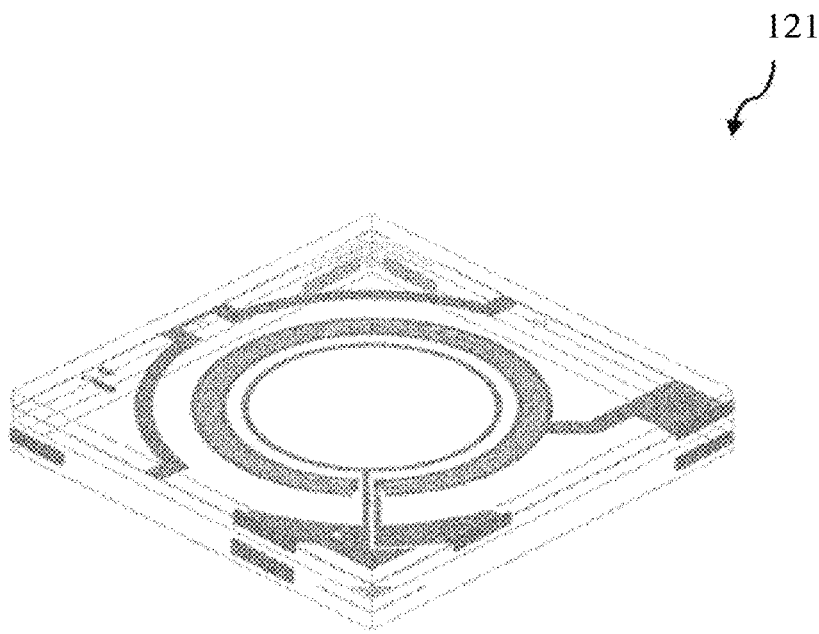
FIG. 1 schematically illustrates an electro-optical lens, as known in the art.

The above and other elements, features, steps, and concepts of the present disclosure will be more apparent from the following detailed description in accordance with exemplary embodiments of the invention, which will be explained with reference to the accompanying drawings.

It is to be understood that the following description of embodiments is not to be taken in a limiting sense. The scope of the invention is not intended to be limited by the embodiments described hereinafter or by the drawings, which are taken to be illustrative examples of the general inventive concept. The features of the various embodiments may be combined with each other, unless specifically noted otherwise.

The drawings are to be regarded as being schematic representations, and elements illustrated in the drawings are not necessarily shown to scale. Rather, the various elements are represented such that their function and general purpose become apparent to a person skilled in the art. While display devices of embodiments may be Human-Machine-Interfaces in an automotive environment, specifically in a vehicle, or may be handheld communication devices, or devices having a touch input display operated by a user, the display device is not limited to being used in such devices.

Entertainment and internet services have an increasing influence in many fields, in particular the automotive industry, however by virtue of regulation in many countries, e.g. a driver of a vehicle should not be distracted from driving by service contents on a dashboard display device.

Accordingly in the automotive display market, there is a trend for high resolution displays with wide color gamut, showing entertainment content to a codriver, however due to wide viewing angles of displays, often the driver will be distracted by the content intended for the codriver.

Conventional techniques for providing dedicated content to a codriver only include statical light control films, such as louver films, prismatic films influencing the angular distribution of a display backlight, with predefined light distributions, i.e. viewing angles of display devices.

For providing more flexibility and viewing comfort to a user of a display device, it may be desirable to show, for example, navigation and other car relevant information in a public mode, i.e. visible to driver and passenger, and entertainment services in privacy mode, i.e. visible only to one or more passengers.

Display devices with switchable privacy mode are, for example, switchable light guide systems using dedicated light guide systems for different viewing angles, or Polymer Dispersed Liquid Crystal (PDLC) systems, which can vary between transparent and diffuse light distributions, but usually depend on high operating voltages. Furthermore, electro-optical beam shaping systems have been demonstrated which include electro-optical diffractive elements, however these systems are based on phase modulation and, therefore, require coherent light, i.e. laser light, as input.

In the following, detailed descriptions for an improved display device with adjustable viewing angle, and a method for operating an improved display device with adjustable viewing angle, in accordance with aspects and embodiments of the invention, will be explained.

FIG. 1 schematically illustrates an electro-optical lens 121, as known in the art.

Electro-optical lenses 121 are electrically driven lenses with tuneable optical power as known in the art, such as Liquid Crystal (LC) lenses. Such lenses include a LC layer between transparent substrates, whose optical power can be controlled by applying an operating voltage to the LC layer. An alignment state of the liquid crystal layer is changed so as to change the refractive index of the liquid crystal layer and change the refractive power of the liquid crystal lens.

Figure 2:
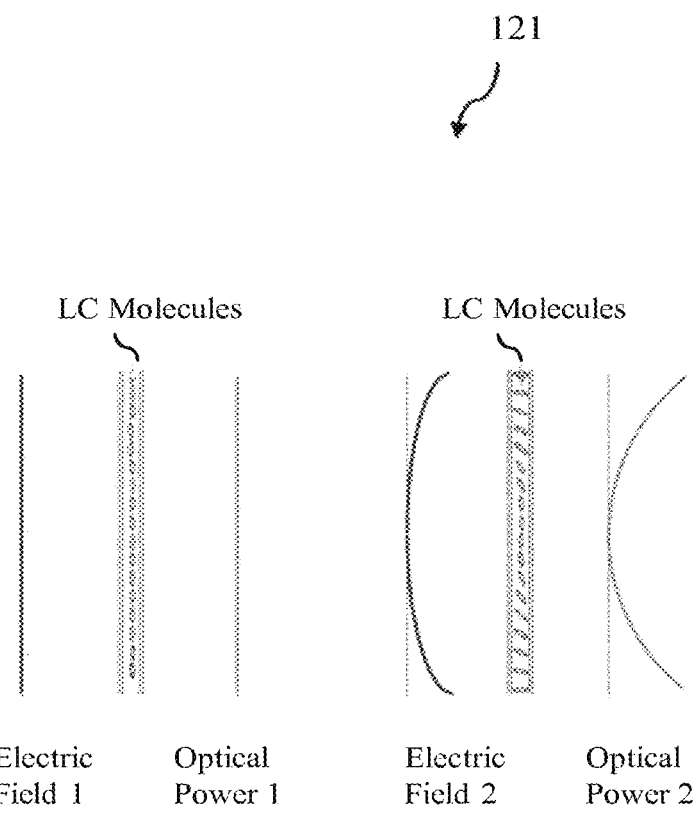
FIG. 2 schematically illustrates how an electro-optical lens is adjusted by applying an electric field, as known in the art.

FIG. 2 schematically illustrates how an optical power of an electro-optical lens 121 is adjusted by applying an electric field, as known in the art.

When an electric field, or an operating voltage, is applied, the LC layer is electrically controlled and utilized to provide a predefined optical power over an optically active area of the electro-optical lens 121 by aligning optically active LC molecules in the LC layer. An off-status may refer to a homogeneous layer, and the light may passes through the LC layer directly. To control a phase retardation of the LC layer, a large number of electrodes may be arranged on the substrates, and may be used to finely control the electrical field on the LC layer.

Figure 3:
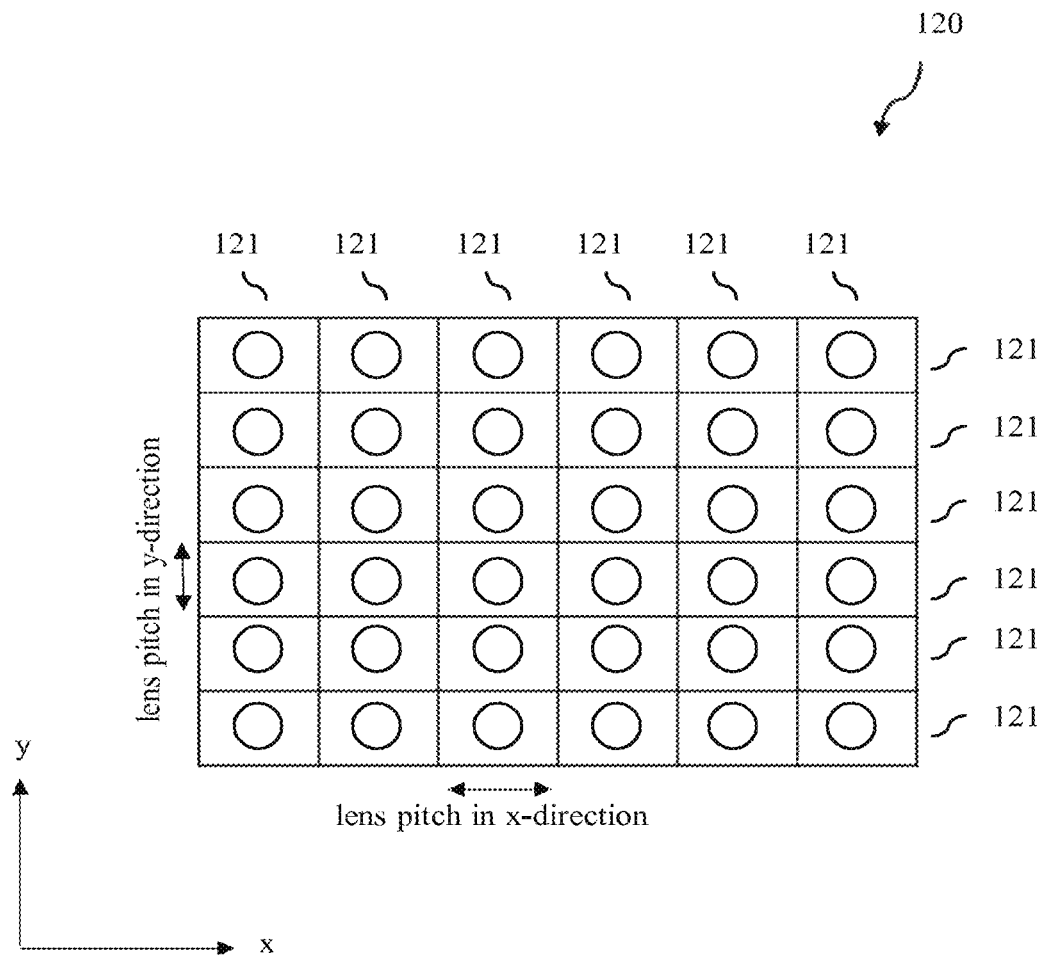
FIG. 3 schematically illustrates a lens array comprising a plurality of electro-optical lenses, according to embodiments of the invention.

FIG. 3 schematically illustrates a lens array 120 comprising a plurality of electro-optical lenses 121, according to embodiments of the invention.

A lens array 120 comprising a plurality of electro-optical lenses 121 is arranged as a 2-dimensional lens array. As depicted in FIG. 3, the electro-optical lenses 121 are arranged in a rectangular matrix, along an x-direction and a y-direction perpendicular to each other, each electro-optical lens 121 having a rectangular shape. Here it is to be understood, that's the shape of the electro-optical lenses 121 arranged in the lens array 120 is not limited to a specific shape, for example the lenses could also have a hexagonal shape, or could be integrally formed in an array on substrates including a plurality of electrodes, such as a micro-lens arrays. Specifically, the optical active area of an electro-optical lens is not limited to a specific shape.

The lens array 120 may have a planar surface and may be defined by an x-direction and a y-direction, which are axes perpendicular to each other. Along the x-direction, the electro-optical lenses 121 are arranged in a lens pitch in x-direction, and along the y-direction, the electro-optical lenses 121 are arranged in a lens pitch in y-direction. In other words, the lens pitches denotes the width, or distance, in the respective direction, after which the following lens is arranged.

Figure 4:
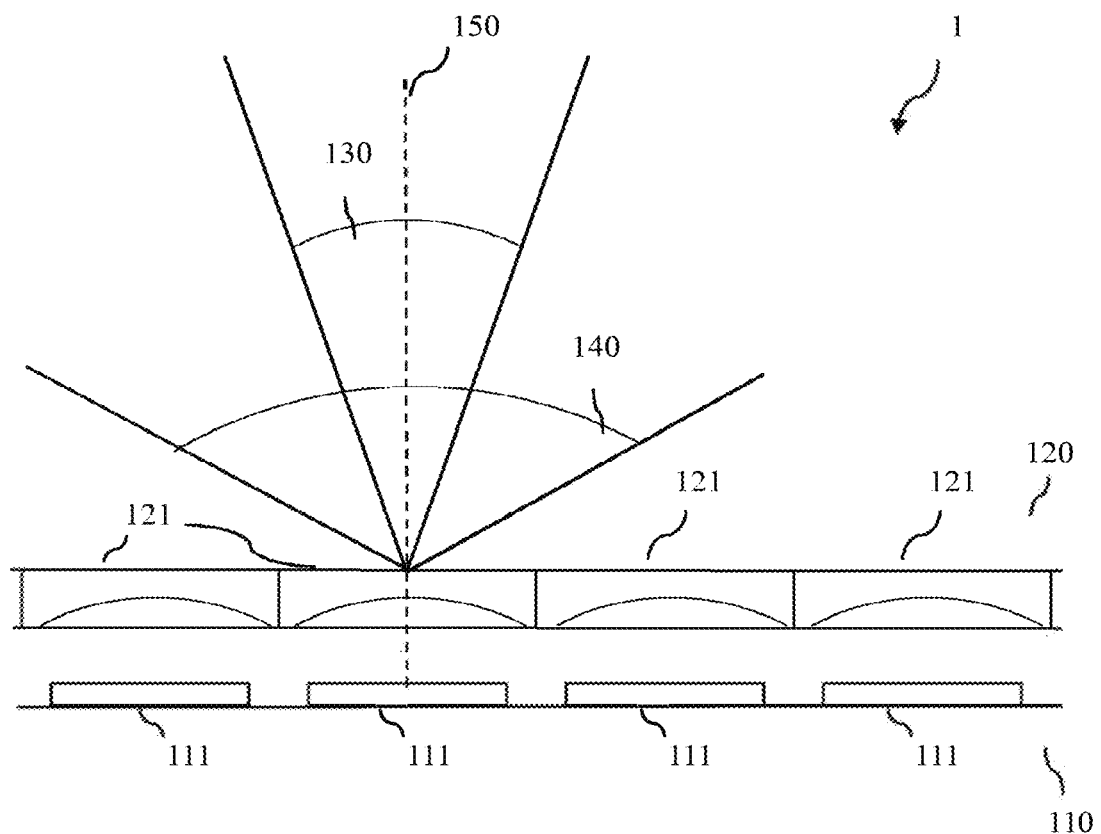
FIG. 4 schematically illustrates a display device, according to embodiments of the invention.

FIG. 4 schematically illustrates a display device, according to embodiments of the invention.

As shown in FIG. 4, the display device 1 includes a display unit 110 including a plurality of pixels 111 for displaying image information to a user looking at the display device 1. The pixels 111 emit light, which is collected and projected forward to a user, or viewer, by optical imaging elements collimating or widening the light into a light beam, such as electro-optical lenses 121.

Above the display unit 110, in other words in the direction of the emitted light by the pixels 111, or in other words between a user and the display unit 110, a lens array 120 is arranged. The lens array 120 includes a plurality of electro-optical lenses 121, wherein each of the plurality of electro-optical lenses 121 is associated with at least one of the plurality of pixels 111. Each electro-optical lens 121 collects the emitted light from the at least one pixel 111 and projects the collected light along an optical projection axis 150 of each electro-optical lens 121. In various examples, each electro-optical lens 121 may collect light from at least one pixel 111, or from a plurality of pixels 111.

For example, each electro-optical lens may collect and project the light of only one of the plurality of pixels. In other words, there may be a one-to-one correspondence between the pixels and adjustable electro-optical lenses.

Each electro-optical lens 121 projects the light forward along an optical projection axis 150 within a selected viewing angle 130, 140. A first viewing angle 130 is broader than a second viewing angle 140. In such a way, a viewing angle 130,140 may be defined as an angle, in which the display information displayed on the display device can be seen by a user. In other words, a viewing angle includes all directions, in which the light intensity of the projected light, or a contrast of the display, is over a predefined threshold. For example, such a predefined threshold may be may be 25%, 10%, 5%, or 1% of the maximum light intensity of the projected light, or the maximum contrast of the display.

Each electro-optical lens 121 can be configured between a first viewing angle 130 and a second viewing angle 140, which is narrower than the first viewing angle 130. In various examples, each electro-optical lens 121 can be continuously configured between the two viewing angles, or can be selectively configured to a determined viewing angle. In a public mode, a first broad viewing angle 140 made be chosen, and a privacy mode, a narrower viewing angle 130 may be chosen.

As can be seen in FIG. 4, for symmetrical light distributions, viewing angle 130,140 may be an angle including the optical axis 150. The optical axis 150 may be the center of the viewing angle 130,140. In various examples, the projected light has a light distribution, or in other words a light intensity distribution over angle, which may be symmetrical to the optical projection axis 150.

In FIG. 4, the optical projection axis 150 extends perpendicular to the surface of the display device 1, however, the optical projection axis 115 may also be directed in a predetermined bias angle from the perpendicular direction at the surface of the display device 1.

For example, it may also be possible, that the electro-optical lenses 121 are configurable such that the optical projection axis 150 of the first viewing angle 130 is in a first direction, and the optical projection axis 150 of the second viewing angle 140 is in a second direction, different from the first direction. A maximum of the light intensity may be on the projection axis 150 of an electro-optical lens 121.

Figure 5:
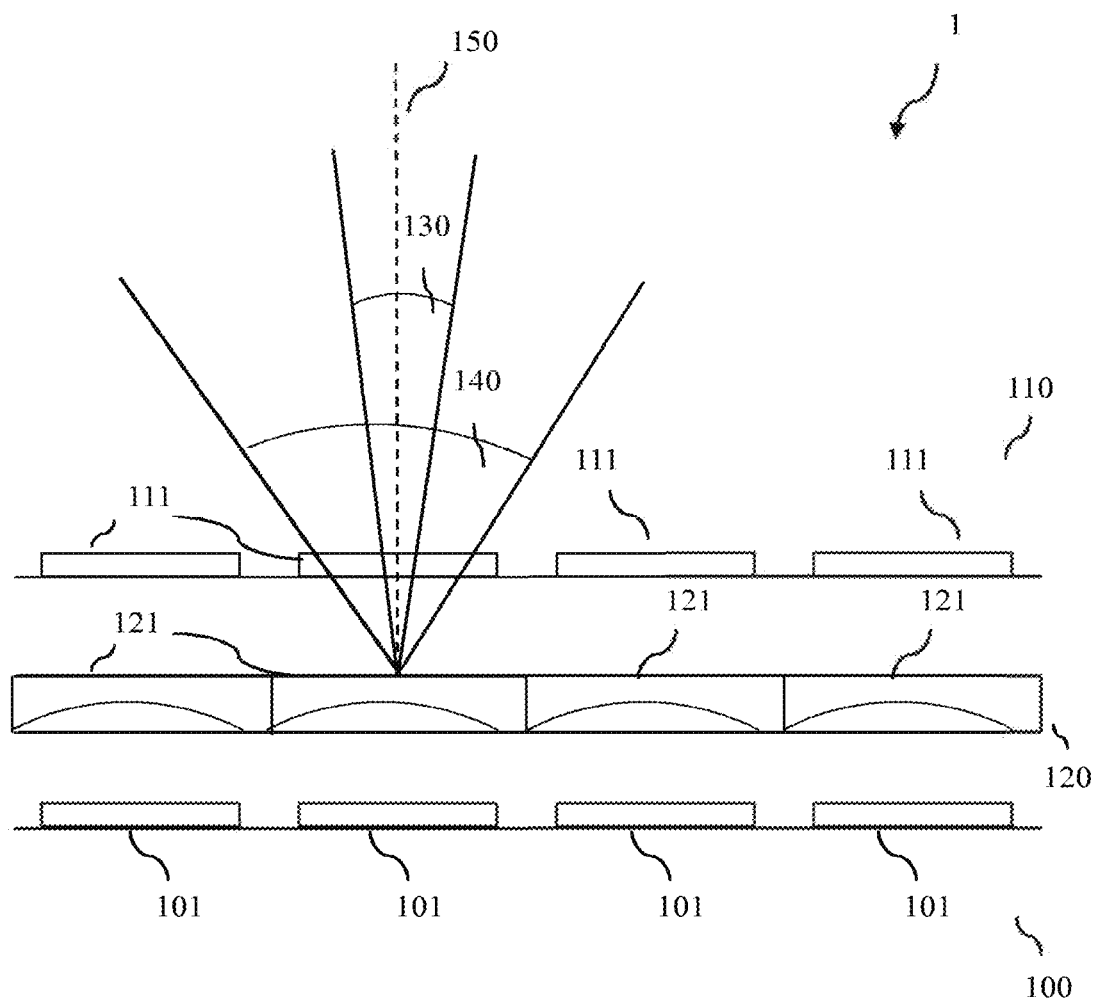
FIG. 5 schematically illustrates another display device, according to embodiments of the invention.

FIG. 5 schematically illustrates another display device, according to embodiments of the invention.

As can be seen in FIG. 5, the display device 1 includes a backlight unit 100 comprising a plurality of backlight light sources 101. The light of the light sources 101 is collected and projected forward onto a plurality of pixels 111 of a display unit 110 by a lens array 120. The lens array 120 is arranged between the backlight unit 100 and the display unit 110, wherein each of the electro-optical lenses 121 in the lens array 120 collects the light of at least one of the plurality of light sources 101, and projects the light forward onto, or through, at least one of the plurality of pixels 111. Therein, the electro-optical lenses 121 can be configured between a public mode and a privacy mode. The public mode refers to a first configuration of each of the electro-optical lenses 121, in which the projected light of each of the lenses is projected within a first viewing angle 140. The privacy mode to a second configuration of each of the electro-optical lenses 121, in which the projected light of each of the lenses is projected within a second viewing angle 130, which is smaller or narrower than the first viewing angle 140.

Figure 6:
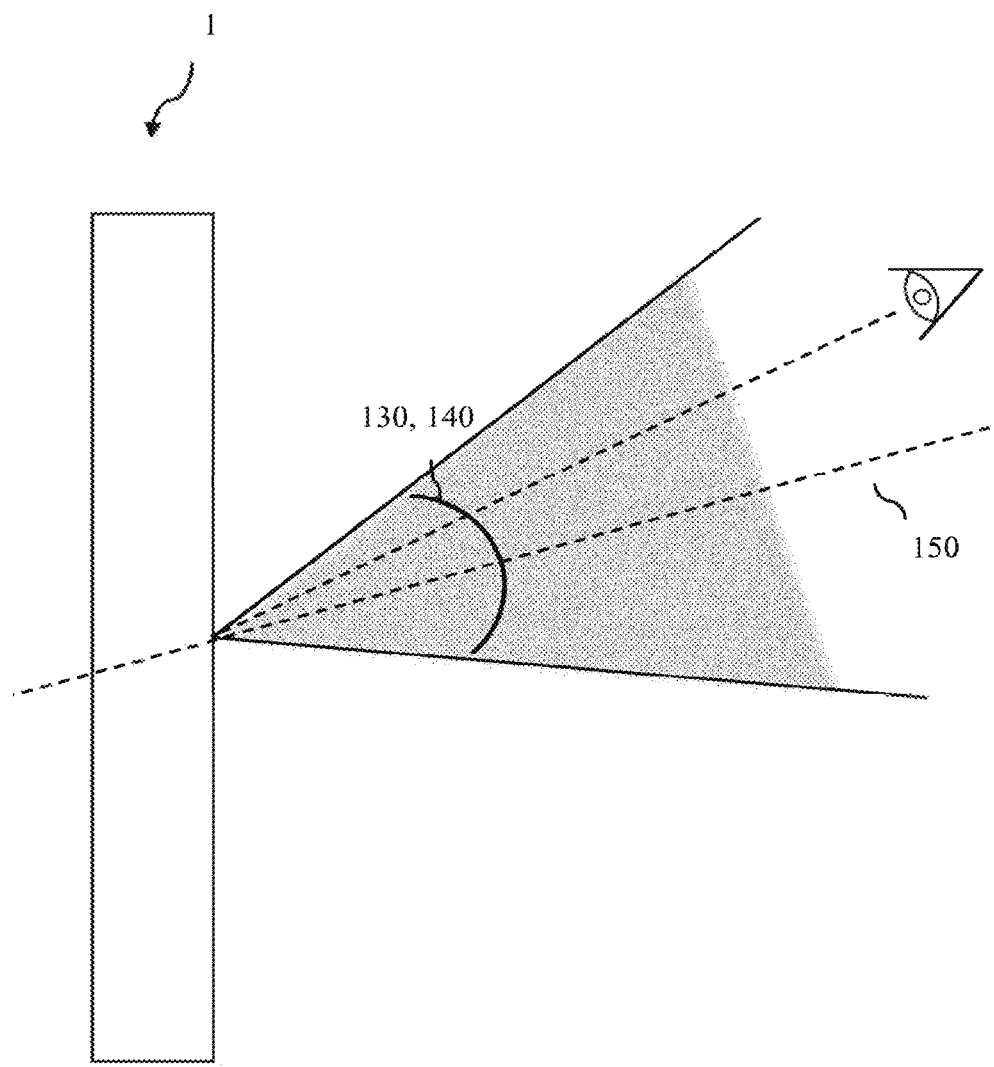
FIG. 6 schematically illustrates a viewing angle of a display device, according to embodiments of the invention.

FIG. 6 schematically illustrates a viewing angle 130,140 of a display device 1, according to embodiments of the invention.

The display device 1 has a surface, on which a user can see the displayed image information. A user looks at the display from a viewing direction relative to the display device 1. A viewing angle 130,140 of the display device 1 is defined as including all directions, in which the user can see the image information on the display device 1. The viewing angle 130,140 may include an optical projection axis 150, wherein the projected light is projected along the optical projection axis 150. A light distribution of the projected light may be symmetrical to the optical projection axis 150, or in other words, the optical projection axis 150 may be in the center of the viewing angle 130,140.

In general, display devices have limited viewing angles, they have lower contrast and become hard to read in some directions with little projected light. For example, a bias may be designed into an electro-optical lens. This means the optical projection axis 150 may be offset from the perpendicular by some amount when no electrical field is applied to the electro-optical lens 121.

A viewing angle 130,140 may correspond to the light distribution of the projected light of each of the plurality of pixels 111, as will be explained referring to FIG. 7, which schematically illustrates a light distribution of an electro-optical lens 121 relative to an optical projection axis 150, according to embodiments of the invention.

A viewing angle may be characterized by the total shape of the light distribution curve. A light distribution curve is a 2D- or polar diagram of the light intensity describing how narrow/broad the light distribution is.

Figure 7:
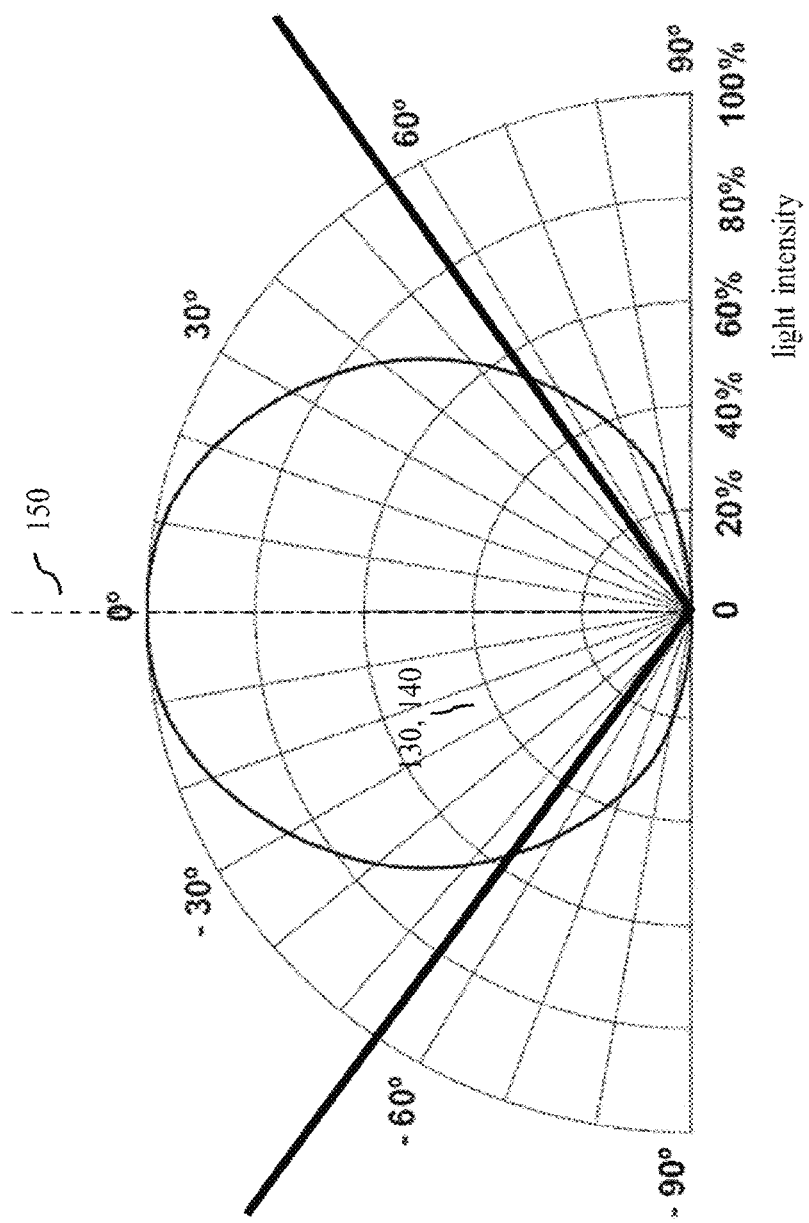
FIG. 7 schematically illustrates a light distribution of an electro-optical lens, according to embodiments of the invention.

As can be seen in FIG. 7, the projected light of each of the electro-optical lenses 121 has a light distribution over angle with a maximum light intensity, or brightness, at 0°, i.e. along the optical projection axis 150. In each direction, the light intensity diminishes until the light intensity reaches 0% of the maximum light intensity at 90°, i.e. in a plane of the electro-optical lens 121. For example, a viewing angle 130,140 may be defined as the angle, in which the light intensity is above a light intensity threshold value. In the example of FIG. 7, the light intensity threshold value is 50%. Accordingly, the viewing angle includes all directions from −55° to +55°, and is equal to 110° in this example.

Figure 8:
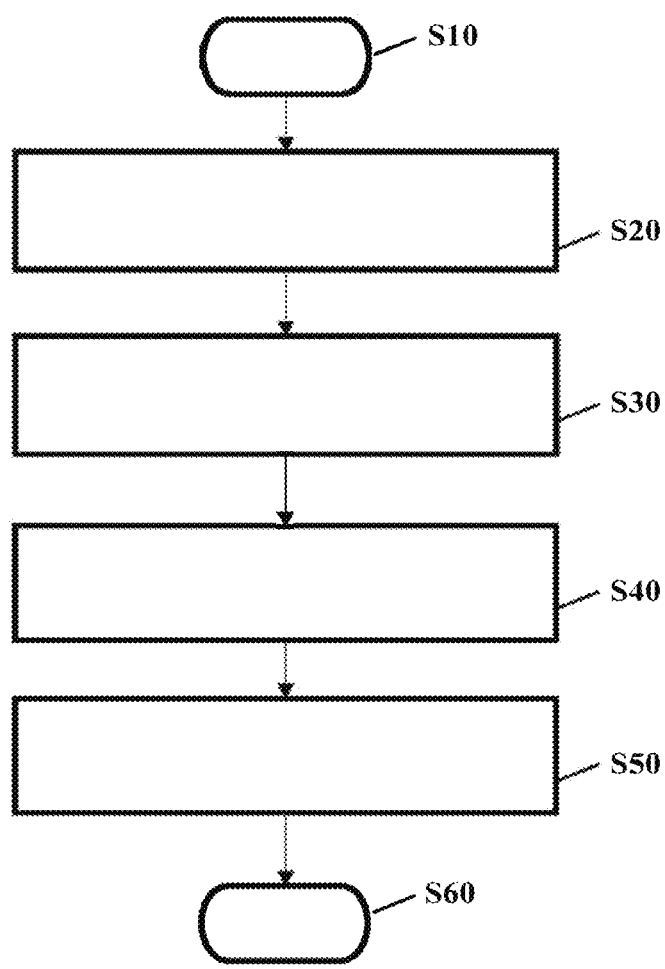
FIG. 8 illustrates a flow chart of a method for operating a display device, according to embodiments of the invention.

FIG. 8 illustrates a flow chart of a method for operating a display device with an adjustable viewing angle, according to embodiments of the invention.

The method starts in step S10. In step S20, a display unit is provided comprising a plurality of pixels arranged in a 2-dimensional pixel array emitting light for displaying image information to a user. In step S30, a plurality of electro-optical lenses is provided with adjustable optical power arranged in a 2-dimensional lens array at the display unit, wherein each electro-optical lens is configured to collect light from at least one of the plurality of pixels and to project the light along a respective lens projection axis. In step S40, an operation mode is determined for the display device. In step S50, each electro-optical lens is adjusted based on the determined operation mode between a public mode, in which the electro-optical lens is configured to project the light along the respective lens projection axis within a first viewing angle, and a privacy mode, in which the electro-optical lens is configured to project the light along the respective lens projection axis within a second viewing angle, smaller than the first viewing angle. The method ends in step S60.

Figure 9:
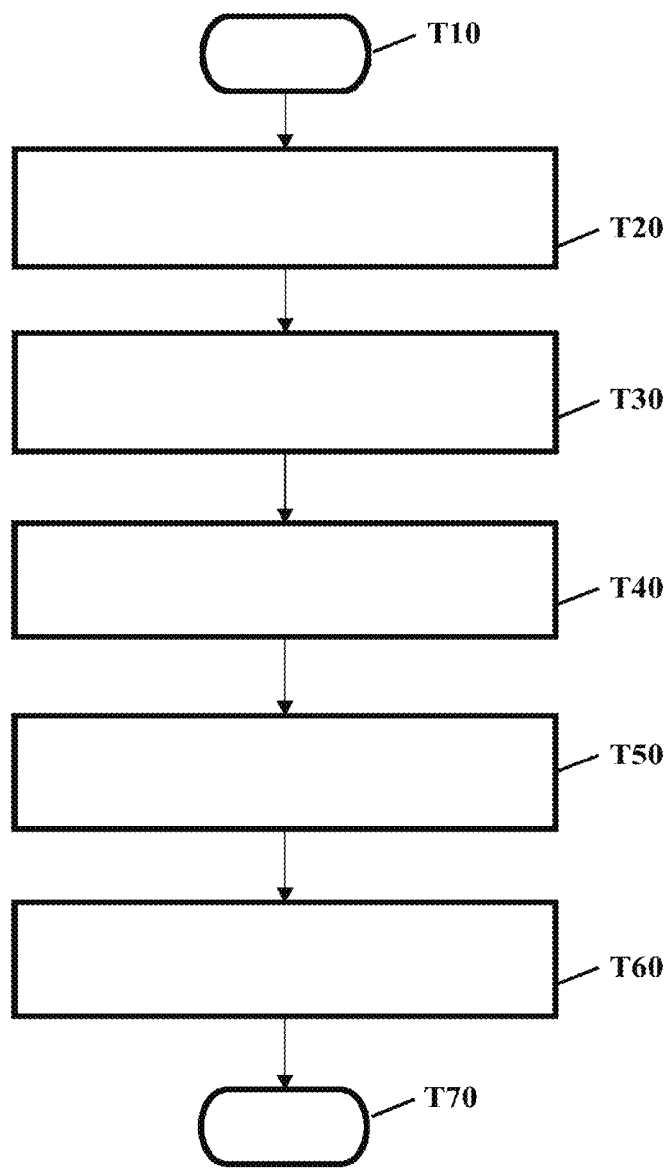
FIG. 9 illustrates a flow chart of another method for operating a display device, according to embodiments of the invention.

FIG. 9 illustrates a flow chart of another method for operating a display device with adjustable viewing angle, according to embodiments of the invention.

The method starts in step T10. In step T20, a backlight unit is provided comprising a plurality of light sources. In step T30, a display unit is provided comprising a plurality of pixels arranged in a 2-dimensional pixel array for displaying image information to a user. In step T40, a plurality of electro-optical lenses is provided with adjustable optical power arranged in a 2-dimensional lens array between the backlight unit and the display unit, wherein each electro-optical lens is configured to collect light from at least one of the plurality of light sources to project the light along a respective lens projection axis of each electro-optical lens onto at least one of the plurality of pixels. In step T50, an operation mode is determined for the display device. In step T60, each electro-optical lens is adjusted based on the determined operation mode between a public mode, in which the electro-optical lens is configured to project the light along the respective lens projection axis within a first viewing angle, and a privacy mode, in which the electro-optical lens is configured to project the light along the respective lens projection axis within a second viewing angle, smaller than the first viewing angle. The method ends in step T70.

From the above said, some general conclusions may be drawn:

The light distribution of the projected light of each of the pixels may be the same along the respective optical projection axis. In particular, the projected light may be distributed having equal viewing angles.

Each electro-optical lens may be configured to project the light of each of the at least one of the plurality of pixels with a light distribution that covers the complete respective first or second viewing angle.

The optical axes of each of the plurality of the electro-optical lenses may be parallel to each other. In such a way, the viewing angles, or light distributions of each of the pixels may have the same angular light distributions, such that a high image quality can be ensured.

The light distribution of the projected light of each of the at least one of the plurality of pixels may be symmetrical with respect to the respective lens projection axis of the associated electro-optical lens, within the respective first or second viewing angle. In other words, each pixel emits light, which is collected and projected by an associated electro-optical lens along an optical projection axis of the electro-optical lens. The projected light of each of the pixels may have the same viewing angle, compared to the projected light of another pixel, of the same or another electro-optical lens.

In case that one electro-optical lens projects the light of a plurality of pixels, the light distribution of the projected light of each of these pixels may have the same beam collimation angle, i.e. viewing angle, and/or the same light distribution, and/or may be projected along the same projection axis of the electro-optical lens.

The pixel array may be a 2-dimensional pixel array arranged in a plane, in which the pixels may be arranged along a x-direction, and, perpendicular to the x-direction, along a y-direction, wherein the pixels may be arranged along the x-direction having a pixel pitch in x-direction, and along the y-direction having a pixel pitch in y-direction, wherein the lens array may be a 2-dimensional lens array arranged in a plane parallel to the pixel array, in which the electro-optical lenses may be arranged along the x- and y-direction, wherein the electro-optical lenses may be arranged along the x-direction having a lens pitch in x-direction, and along the y-direction having a lens pitch in y-direction, and wherein the lens pitch in x-direction may be the same as, or an integer multiple of, the pixel pitch in x-direction, and the lens pitch in y-direction may be the same as, or an integer multiple of, the pixel pitch in y-direction. In such a way, it may be ensured, that the projected light of each of the pixels has the same viewing angle, i.e. is projected in the same direction with the same light distribution in that projection direction.

The electro-optical lenses may be electrically driven Liquid Crystal (LC) lenses, which are controlled by applying an electrical voltage to the electro-optical lens.

The electro-optical lenses may be integrally formed in a 2-dimensional micro-lens array, having a transparent upper and a lower substrate.

Each electro-optical lens may be configured to cover the full viewing angle with the projected light of each pixel.

Each one of the electro-optical lenses may be associated with exactly one pixel, wherein each lens may be associated with a different pixel, and configured to collect and project the light from the associated pixel. In other words, there may be a one-to-one relationship, or an unambiguous one-to-one association between pixels and lenses, or unique pixel lens pairs, wherein each pixel may be associated with only one lens and each lens may be associated with only one pixel.

In various other examples, each lens may be associated with a plurality of pixels, wherein every pixel illuminates the complete lens.

Adjusting the electro-optical lenses may refer to applying an electrical field by an operating voltage to the LC layer, such that the optical power, i.e. focal length, of the lens changes. The optical power may change in such a way, that a projection axis of the lens, i.e. the direction, in which the maximum light intensity of the projected light, or the center of the projected light distribution, is projected is changed, or that the viewing angle of the light distribution is changed. While adjusting the electro optical lens, the association between the electro-optical lenses and the pixels, and the position relative to each other remain unchanged.

By adjusting a viewing angle of a display device using an array of electro-optical lenses, no additional louvers or optical barriers may be used to achieve the optical effect, in particular no interaction effects of louvers or optical barriers with polarization filters may be necessary to achieve the optical effect of varying viewing angles.

Specifically, each electro-optical lens may have a respective lens projection axis originating from a center of the electro-optical lens. In relation to the lens projection axis, the light of each lens has the same light distribution over angle, i.e. the same viewing angle. More specifically, each lens is located in relation to the at least one associated pixels in such a way, that the light of each of the at least one pixels is collected and projected along the optical projection axis having the same viewing angle and/or light distribution.

In such a way, a viewing angle of the display device, specifically of each pixel, may be selectively adjustable to one of a plurality of predetermined viewing angles.

A viewing angle may be solid angle, which may be axially symmetrical around a lens projection axis, and which includes, or limits a light distribution above a predefined threshold intensity. The threshold intensity may be defined relative to the maximum intensity of the projected light.

For example, the projected light of each of the pixels may be projected by a cylindrical electro-optical lens, and thereby may have a mirror symmetry with respect to a plane including the cylinder axis of electro-optical lens and the lens projection axis.

A light distribution from a pixel may be collimated or widened by complete optical area of an electro-optical lens. In other words, the light distribution may be collimated or widened into a light beam with a new light distribution symmetrical about the lens axis, additionally with varying viewing angle, and or varying direction of the lens projection axis, and in general with varying light distribution, however the light of each pixel is projected having the same beam properties, in particular the same projection direction.

A second viewing angle may, in relation to the first viewing angle, refer to a more focussed light beam, a lower beam divergence, a narrower light distribution.

The light distributions within the first and/or the second viewing angles may be symmetrical light distributions with respect to the lens axis, which optionally also have varying lens projection axes.

The public mode may also refer to a state of the electro-optical lens, where the lens has no optical power.

An optical projection axis may be a symmetry axis of the electro-optical lens, specifically may be orientated in 90° to a surface, in which the electro-optical lens is arranged.

The lens array may comprises a plurality of identical electro-optical lenses in each direction of lens array.

The display device may be an on-board display device in a vehicle, and wherein each lens projection axis extends in a direction from the display device towards a codriver position in the vehicle. By applying a bias in the projection direction, the viewing angle may be directed better towards the intended viewer, thus providing a better image quality.

The display device may be an on-board display device of a vehicle, wherein at least one of the first viewing angle and the second viewing angle may be determined based on an operating condition of the vehicle, and/or the operation mode may be determined based on user input, or based on a vehicle operation mode.

The display device may be an on-board display device of a vehicle, wherein the first viewing angle may be determined based on the position of a driver and the position of a codriver in the vehicle, such that the driver and the codriver can see the image information on the display device, and the second viewing angle may be determined based on the positions of the driver and the codriver in the vehicle, such that only the codriver can see the image information on the display device.

Summarizing, an improved display device is provided by arranging an array of tuneable electro-optical lenses in the display device, such that the viewing angle of the display device may be variably adjusted to a public mode and a privacy mode. Embodiments of the present disclosure relate to techniques for a directional backlight, wherein adjustable electro-optical lenses are used, preferably in an integrally formed lens array, with monolithic upper/lower substrates for a plurality of lenses, which may be comprised in or directly adjacent to a backlight unit of a display device.

Thereby, a switchable privacy mode may be enabled in a flexible and energy efficient manner for the display device with a low component height of a switchable directional backlight unit, such that image information may be displayed only to selected users.

Although the invention has been shown and described with respect to certain preferred embodiments, equivalents and modifications will occur to others skilled in the art upon reading and understanding the specification. The present invention includes all such equivalents and modifications and is limited only by the scope of the appended claims.

The invention claimed is:

1. A display device with an adjustable viewing angle, the display device comprising:
   a backlight unit comprising a plurality of light sources for illuminating pixels of a display unit;
   a plurality of electro-optical lenses with adjustable optical power arranged in a lens array between the backlight unit and the display unit, wherein each electro-optical lens is configured to collect light from at least one of the plurality of light sources and to project the light along a respective lens projection axis onto at least one of a plurality of pixels; and
   a display unit comprising a plurality of pixels arranged in a pixel array for displaying image information to a user;
   wherein each electro-optical lens is adjustable between:
   a public mode, in which the electro-optical lens is configured to project the light along the respective lens projection axis within a first viewing angle, and
   a privacy mode, in which the electro-optical lens is configured to project the light along the respective lens projection axis within a second viewing angle, smaller than the first viewing angle,
   wherein the lens projection axis is directed in a predetermined bias angle from a perpendicular direction at a surface of a display surface.

2. The display device of claim 1, wherein each electro-optical lens is configured to project the light of each of the at least one of the plurality of light sources with a light distribution that covers the complete respective first or second viewing angle, wherein an optical axes of the electro-optical lenses are parallel to each other.

3. The display device of claim 2, wherein the light distribution of the projected light of each of the at least one of the plurality of light sources is symmetrical with respect to the lens projection axis within the respective first or second viewing angle.

4. The display device of claim 1, wherein pixel array is arranged in a plane, in which the pixels are arranged along a x-direction, and, perpendicular to the x-direction, along a y-direction, wherein the pixels are arranged along the x-direction having a pixel pitch in x-direction, and along the y-direction having a pixel pitch in y-direction,
   wherein the lens array is arranged in a plane parallel to the pixel array, in which the electro-optical lenses are arranged along the x- and y-direction, wherein the electro-optical lenses are arranged along the x-direction having a lens pitch in x-direction, and along the y-direction having a lens pitch in y-direction, and
   wherein the lens pitch in x-direction is the same as or an integer multiple of the pixel pitch in x-direction, and the lens pitch in y-direction is the same as or an integer multiple of the pixel pitch in y-direction.

5. The display device of claim 1, wherein each electro-optical lens collects and projects the light of only one of the plurality of light sources.

6. The display device of claim 1, wherein the electro-optical lenses are Liquid Crystal (LC) lenses.

7. The display device of claim 1, wherein the electro-optical lenses are integrally formed in a LC lens array having monolithical upper and lower substrates, wherein an electro-optical lens of the plurality of electro-optical lens has a predefined optical power portion provided by at least one of the upper substrates and the lower substrates enclosing LC molecules, and a variable optical power portion provided by different alignments of the LC molecules depending on a variable electrical field.

8. The display device of claim 1, wherein the display device is an on-board display device in a vehicle, and wherein each lens projection axis extends in a direction from the display device toward a codriver position in the vehicle.

9. The display device of claim 1, wherein the display device is an on-board display device of a vehicle, and wherein at least one of the first viewing angle and the second viewing angle is determined based on an operating condition of the vehicle.

10. The display device of claim 1, wherein the display device is an on-board display device of a vehicle, wherein the first viewing angle is determined based on positions of a driver and a codriver in the vehicle, such that the driver and the codriver can see the image information on the display device, and wherein the second viewing angle is determined based on the positions of the driver and the codriver in the vehicle, such that only the codriver can see the image information on the display device.

11. A display device with an adjustable viewing angle, the display device comprising:
   a display unit comprising a plurality of pixels arranged in a pixel array and emitting light for displaying image information to a user; and
   a plurality of electro-optical lenses with adjustable optical power arranged in a lens array at the display unit, wherein each electro-optical lens is configured to collect the light from at least one of the plurality of pixels and to project the light along a respective lens projection axis;
   wherein each electro-optical lens is adjustable between:
   a public mode, in which the electro-optical lens is configured to project the light along the respective lens projection axis within a first viewing angle, and
   a privacy mode, in which the electro-optical lens is configured to project the light along the respective lens projection axis within a second viewing angle, smaller than the first viewing angle,
   wherein the lens projection axis is directed in a predetermined bias angle from a perpendicular direction at a surface of a display surface.

12. A method for operating a display device with an adjustable viewing angle, the method comprising:
   providing a backlight unit comprising a plurality of light sources;
   providing a display unit comprising a plurality of pixels arranged in a pixel array for displaying image information to a user; and
   providing a plurality of electro-optical lenses with adjustable optical power arranged in a lens array between the backlight unit and the display unit, wherein each electro-optical lens is configured to collect light from at least one of the plurality of light sources to project the light along a respective lens projection axis of each electro-optical lens onto at least one of the plurality of pixels,
   determining an operation mode for the display device;

adjusting each electro-optical lens based on a determined operation mode between:
a public mode, in which each electro-optical lens is configured to project the light along the respective lens projection axis within a first viewing angle, and
a privacy mode, in which each electro-optical lens is configured to project the light along the respective lens projection axis within a second viewing angle, smaller than the first viewing angle,
wherein the lens projection axis is directed in a predetermined bias angle from a perpendicular direction at a surface of a display surface.

13. A method for operating a display device with an adjustable viewing angle, the method comprising:
providing a display unit comprising a plurality of pixels arranged in a pixel array emitting light for displaying image information to a user; and
providing a plurality of electro-optical lenses with adjustable optical power arranged in a lens array at the display unit, wherein each electro-optical lens is configured to collect light from at least one of the plurality of pixels and to project the light along a respective lens projection axis,
determining an operation mode for the display device;
adjusting each electro-optical lens based on the determined operation mode between:
a public mode, in which the electro-optical lens is configured to project the light along the respective lens projection axis within a first viewing angle, and
a privacy mode, in which the electro-optical lens is configured to project the light along the respective lens projection axis within a second viewing angle, smaller than the first viewing angle,
wherein the lens projection axis is directed in a predetermined bias angle from the perpendicular direction at the surface of the display surface.

14. The method of claim 12, wherein the display device is an on-board display device in a vehicle, and wherein the operation mode is determined based on user input, or based on a vehicle operation mode.

15. A vehicle display device with an adjustable viewing angle, the vehicle display device comprising:
a backlight unit comprising a plurality of light sources for illuminating pixels of a display unit;
a plurality of electro-optical lenses with adjustable optical power arranged in a lens array between the backlight unit and the display unit, wherein each electro-optical lens is configured to collect light from at least one of the plurality of light sources and to project the light along a respective lens projection axis onto at least one of a plurality of pixels; and
a display unit comprising a plurality of pixels arranged in a pixel array for displaying image information to a user;
wherein each electro-optical lens is adjustable between:
a public mode, in which the electro-optical lens is configured to project the light along the respective lens projection axis within a first viewing angle, and
a privacy mode, in which the electro-optical lens is configured to project the light along the respective lens projection axis within a second viewing angle, smaller than the first viewing angle,
wherein the lens projection axis is directed in a predetermined bias angle from a perpendicular direction at a surface of a display surface.

16. The vehicle display device of claim 15, wherein each electro-optical lens is configured to project the light of each of the at least one of the plurality of light sources with a light distribution that covers the complete respective first or second viewing angle, wherein an optical axes of the electro-optical lenses are parallel to each other.

17. The vehicle display device of claim 15, wherein a light distribution of the projected light of each of the at least one of the plurality of light sources is symmetrical with respect to the lens projection axis within the respective first or second viewing angle.

18. The vehicle display device of claim 15, wherein pixel array is arranged in a plane, in which the pixels are arranged along a x-direction, and, perpendicular to the x-direction, along a y-direction, wherein the pixels are arranged along the x-direction having a pixel pitch in x-direction, and along the y-direction having a pixel pitch in y-direction,
wherein the lens array is arranged in a plane parallel to the pixel array, in which the electro-optical lenses are arranged along the x- and y-direction, wherein the electro-optical lenses are arranged along the x-direction having a lens pitch in x-direction, and along the y-direction having a lens pitch in y-direction, and
wherein the lens pitch in x-direction is the same as or an integer multiple of the pixel pitch in x-direction, and the lens pitch in y-direction is the same as or an integer multiple of the pixel pitch in y-direction.

19. The vehicle display device of claim 15, wherein each electro-optical lens collects and projects the light of only one of the plurality of light sources.

* * * * *